Aug. 2, 1949.　　　A. E. BUBSER, JR　　　2,477,575
FASTENING DEVICE
Filed July 14, 1945

Inventor
ANDREW E. BUBSER, JR.

By Ralph L. Chappell
Attorney

Patented Aug. 2, 1949

2,477,575

UNITED STATES PATENT OFFICE 2,477,575

FASTENING DEVICE

Andrew E. Bubser, Jr., United States Navy

Application July 14, 1945, Serial No. 605,161

3 Claims. (Cl. 24—226)

(Granted under the act of March 3, 1883, as amended April 30, 1928; 370 O. G. 757)

This invention relates to fastening devices. It further relates to a separable fastener for belts, straps and the like comprising two members, one of which is slotted and the other is shaped to conform to the slot in fastening and releasing positions.

One object of the invention is to provide a belt or strap fastener of strong and durable construction.

Another object is to provide a fastener which is easily placed in holding position and readily released therefrom.

In particular, it is an object of the invention to provide a fastener which is readily releasable by one hand.

It is known in the art to provide fasteners of the two separable member type in which one is provided with a T-shaped slot and the other member is T-shaped and adapted to cooperate with the slot in the other member in order to form a fastening combination; but it has not been customary to provide a fastener which is readily releasable with one hand.

In order to have a clearer conception of one embodiment of the invention, reference is made to the drawings in which.

Figure 1:
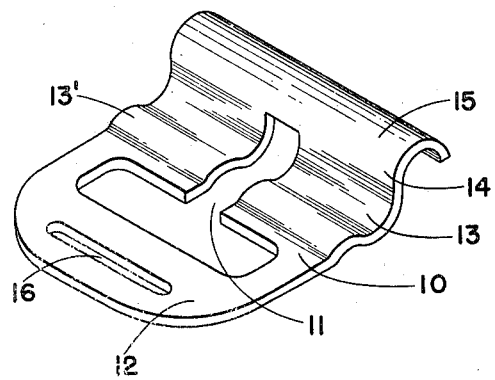
Figure 1 is an isometric projection in elevation of one member of the fastening device.
Figure 2:
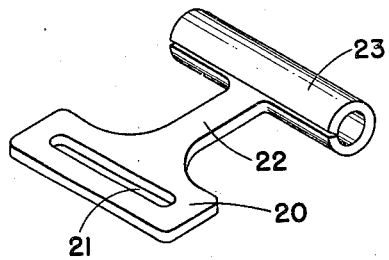
Figure 2 is an isometric projection in elevation of the other member of the fastening device.
Figure 3:
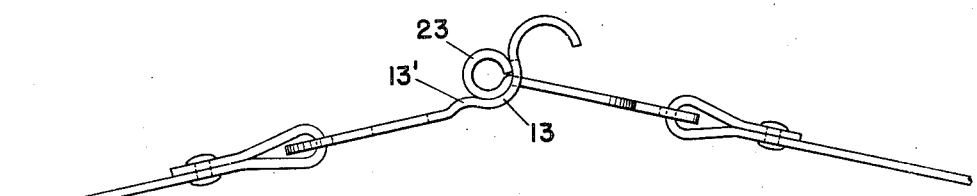
Figure 3 is a side elevation of the two members in fastening position.
Figure 4:
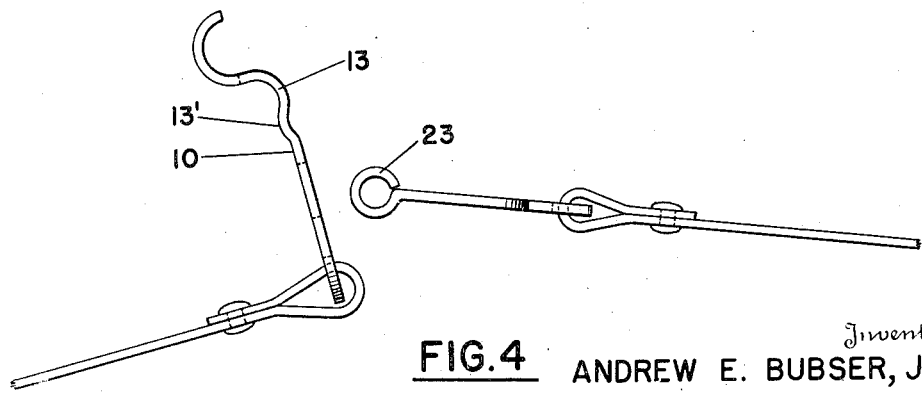
Figure 4 is a side elevation of the two members in releasing position.

Referring to Figure 1, 10 represents the female member of the fastener combination which is provided with a substantially T-shaped slot 11. An end portion 12, which is flat, constitutes one extremity of the member and an elevated handle portion 14, which is provided with an arcuate top 15 forming a turned over terminus, constitutes the other end. The end portion 12 is provided with a transverse slot 16 which is adapted to retain a strap or belt. Connecting end portion 12 and elevated handle 14 is a compound curved seat 13, the function of which will appear later. In Figure 2 the other member 22, which is substantially T-shaped, is provided with a base portion 20 which has a transverse slot 21 therein for the retention of a strap or belt, a shank portion of the member 22 which is narrower than slot 11, and cross-bar 23 at the other end of the shank. Cross-bar 23 is cylindrical in contour and is of such diameter that it readily passes through the transverse portion of slot 11. In Figure 3, the two members are shown in fastening position. In this view, the cross-bar 23 is shown in contact with the curved seat 13. The function of the compounding of curved seat 13 is seen to be to provide an elevated or humped portion 13' between seat 13 and end portion 12. Humped portion 13' serves to hold the T-head or cross-bar 23 in fastened position and to permit a ready release when member 10 is turned to releasing position. In Figure 4 the two members are shown in releasing position. The release occurs when the slotted member is rotated about its fastening axis so as to form an angle slightly greater than 90° with the other member. Handle 14 is shown to be elevated above the plane of end portion 12 of the slotted member. This affords a sufficient clearance between the edge of the arcuate top 15 and the T-shaped member 22 to form an abutment for the fingers or the base of the palm of the hand.

The operation of the device is obviously very simple. In general two hands are required to insert the T-shaped member into the slotted member, but the release is as above indicated. It requires only the single-handed rotation of the slotted member to such a degree that the cross-bar of the T-shaped member slides along the shank of the slotted member and passes out through the transverse slot. In use the device is under tension which fact promotes both the fastening together and the releasing of the two members.

This particular type of belt fastener has an important function on the belts used with life-saving jackets in landing operations. All troops are equipped with life-saving jackets in addition to their other equipment, and it has frequently occurred that upon reaching the beach after immersion in cold sea water that the hands of the trooper are numb and cold, and in cases where the particular belt fastener requires two hands for operation, considerable time is spent in taking the life jacket off. With this invention, even with cold, numb hands the slotted member can be rotated to the release position and the life jacket can be quickly discarded.

While the embodiment, herein disclosed, has been drawn to members of particular shape, i. e., members provided with base, shank, handle or cross-bar, it is not desired to be limited thereto, as it is obvious to one skilled in the art that both members may be of a variety of shapes and the slot may be otherwise than T shaped and the combination of the two members still function in the prime requisite of a single-handed, quick release. Such modifications are intended to be included within the scope of the present invention.

The invention described herein may be made or used by or for the Government of the United States for governmental purposes without the payment to me of any royalties thereon or therefor.

What I claim is:

1. A buckle adapted to join strap ends, comprising two separable plate members, one member having a strap attachment end, a connector end provided with a transverse, reversely curved terminal element, a transverse curved ridge on the same plate side as the offset element and parallel thereto, and a T-slot formed in the plate with the T-head transverse between the ridge and attachment end and the T-stem extending to the plate terminal through said ridge, and the other member having an attachment end and a T-shape connector end adapted to engage the T-slot of the one member, with the head of the T-shape connector nesting between the ridge and offset element of the one member, whereby relative movement between the separable plates when under tension is prevented.

2. The subject matter of claim 1 with the added limitation of the terminal element of said one member being offset from the plane of the attachment end of said one member and extending appreciably beyond the T-stem of the one member slot.

3. A buckle adapted to join strap ends, comprising two separable plate members, one member having a strap attachment end, a connector end provided with a transverse reversely curved terminal element, a transverse curved ridge on the same plate side as the offset element and parallel thereto, and a T-slot formed in the plate with the T-head transverse between the ridge and attachment end and the stem extending to the plate terminal through said ridge, and the other member having an attachment end and a T-shape connector end adapted to engage the T-slot of the one member, with the head of the T-shape connector being cylindrical in form and nesting in the groove formed between the ridge and offset element of the one member, whereby a pivot bearing is formed.

ANDREW E. BUBSER, Jr.

REFERENCES CITED

The following references are of record in the file of this patent:

UNITED STATES PATENTS

| Number | Name | Date |
| --- | --- | --- |
| 311,104 | Colton | Jan. 20, 1885 |
| 474,156 | Buell | May 3, 1892 |
| 690,904 | Crane | Jan. 7, 1902 |
| 709,536 | Crane | Sept. 23, 1902 |
| 1,494,610 | McGlashan | May 20, 1924 |

FOREIGN PATENTS

| Number | Country | Date |
| --- | --- | --- |
| 146,846 | Australia | Aug. 25, 1936 |
| 446,197 | Great Britain | Apr. 27, 1936 |